(12) United States Patent
Kim et al.

(10) Patent No.: US 9,081,969 B2
(45) Date of Patent: Jul. 14, 2015

(54) APPARATUS AND METHOD FOR REMOTELY DELETING CRITICAL INFORMATION

(71) Applicant: ELECTRONICS AND TELECOMMUNICATIONS RESEARCH INSTITUTE, Daejeon (KR)

(72) Inventors: Jae-Heon Kim, Daejeon (KR); Sang-Kyung Yoo, Daejeon (KR); Kwon-Ho Ryu, Daejeon (KR); Sang-Han Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 83 days.

(21) Appl. No.: 13/945,591

(22) Filed: Jul. 18, 2013

(65) Prior Publication Data

US 2014/0068780 A1 Mar. 6, 2014

(30) Foreign Application Priority Data

Sep. 3, 2012 (KR) .................. 10-2012-0097008

(51) Int. Cl.
| | |
|---|---|
| G06F 7/04 | (2006.01) |
| G06F 21/60 | (2013.01) |
| G06F 21/88 | (2013.01) |
| H04L 9/32 | (2006.01) |
| H04W 12/12 | (2009.01) |

(52) U.S. Cl.
CPC ............... *G06F 21/60* (2013.01); *G06F 21/88* (2013.01); *H04L 9/3278* (2013.01); *H04W 12/12* (2013.01); *G06F 2221/2143* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 2008/0231418 A1* | 9/2008 | Ophey et al. ................. | 340/5.85 |
| 2011/0055851 A1 | 3/2011 | Potkonjak et al. | |
| 2011/0244830 A1 | 10/2011 | Chesnutt et al. | |
| 2012/0002803 A1* | 1/2012 | Adi et al. ........................ | 380/28 |

FOREIGN PATENT DOCUMENTS

| | | |
|---|---|---|
| KR | 10-2006-0116089 A | 11/2006 |
| KR | 10-2007-0057968 A | 6/2007 |
| KR | 10-2010-0075355 A | 7/2010 |
| KR | 10-2011-0015191 A | 2/2011 |
| KR | 10-2011-0055091 A | 5/2011 |
| KR | 10-2012-0059587 A | 6/2012 |
| WO | 2006/033065 A1 | 3/2006 |

* cited by examiner

*Primary Examiner* — Brandon Hoffman
(74) *Attorney, Agent, or Firm* — LRK Patent Law Firm

(57) ABSTRACT

An apparatus and method for remotely deleting critical information is provided. The apparatus includes a storage unit, an identity determination unit, and a broadcast unit. The storage unit stores an input value and an output value for the input value with respect to a physically unclonable function (PUF) of each of a plurality of mobile terminals. The identity determination unit determines the identity of a corresponding mobile terminal based on received information about the loss of the mobile terminal. The broadcast unit extracts the input and output values of the PUF of the corresponding mobile terminal from the storage unit based on information transferred from the identity determination unit, and broadcasts the extracted input and output values to all the mobile terminals.

12 Claims, 4 Drawing Sheets

APPARATUS AND METHOD FOR REMOTELY DELETING CRITICAL INFORMATION

CROSS REFERENCE TO RELATED APPLICATION

This application claims the benefit of Korean Patent Application No. 10-2012-0097008, filed on Sep. 3, 2012, which is hereby incorporated by reference in its entirety into this application.

BACKGROUND OF THE INVENTION

1. Technical Field

The present invention relates generally to an apparatus and method for remotely deleting critical information and, more particularly, to an apparatus and method that are capable of remotely deleting critical information using a physically unclonable function (PUF).

2. Description of the Related Art

In cryptosystem installed in mobile terminals, critical information including a number of keys, such as a master key, a wrap key, a session key, etc., is used. This critical information necessitates the function of deleting it if necessary in the event of a case in which the mobile terminal equipped with the cryptosystem is lost.

In general, in order to remotely delete information in a server-client environment, a server, that is, the agent of the deletion, should broadcast a deletion command. In this case, transmitter authentication that is performed by the server is essential. If the server, that is, a transmitting side, is not authenticated, a mobile terminal that has received the deletion command cannot verify the agent that has transferred the deletion command. That is, if the transmitting side is not authenticated, an attacker may delete critical information by generating a deletion command message and transferring the deletion command to a specific mobile terminal. This means that the entire system of the mobile terminal is susceptible to an unexpected serious threat.

Currently, a method that includes the identity of a deletion target in a deletion command, signs the command with a digital signature, and broadcasts the command is chiefly used as transmitter authentication technology. In this case, if the identity of the deletion target is regarded as critical information, additional symmetric key encryption is used to provide confidentiality.

Accordingly, in order to remotely delete critical information, the current method necessitates public key encryption. Meanwhile, in order to apply public key encryption, an infrastructure referred to as a Public Key Infrastructure (PKI) is required. In practice, it is difficult to use the method in an environment in which a PKI has not been established.

Meanwhile, Korean Patent Application Publication No. 10-2012-0059587 discloses a method in which, in the transition of the state of a finite state machine (FSM) inside an integrated circuit, there are a variety of subsequent states. Furthermore, this method allows a transition target state to be determined by the output of the PUF of a chip, an event generator, and a separate control logic.

That is, in the method disclosed in Korean Patent Application Publication No. 10-2012-0059587, information is input from the outside to the event generator as an input that is used for the transition of the state of the FSM inside the integrated circuit. Event information that is output by the event generator is input to a PUF, the PUF receives the event information and outputs predetermined output data, and the output data is processed by the control logic.

Since this PUF is not a mathematical function, a fuzzy extractor is additionally applied to the output value of the PUF in most of methods using PUFs. In this case, additional data, such as helper data, and an error correction code are also required.

SUMMARY OF THE INVENTION

Accordingly, the present invention has been made keeping in mind the above problems occurring in the conventional art, and an object of the present invention is to provide an apparatus and method for remotely deleting critical information that are capable of remotely deleting the critical information of a cryptosystem installed in a mobile terminal using a PUF.

In accordance with an aspect of the present invention, there is provided an apparatus for remotely deleting critical information, including a storage unit configured to store an input value and an output value for the input value with respect to a physically unclonable function (PUF) of each of a plurality of mobile terminals; an identity determination unit configured to determine the identity of a corresponding mobile terminal based on received information about the loss of the mobile terminal; and a broadcast unit configured to extract the input and output values of the PUF of the corresponding mobile terminal from the storage unit based on information transferred from the identity determination unit, and to broadcast the extracted input and output values to all the mobile terminals.

The apparatus may further include a measurement unit configured to measure the output value for the input value determined with respect to the PUF of each of the mobile terminals, and to transmit the measured output value to the storage unit.

The apparatus may further include a storage unit configured to store the identity of each of the mobile terminals.

The storage unit may store the input and output values for the PUF of each of the mobile terminals as an input value-output value pair.

The mobile terminals are mobile phones, satellite phones, Personal Digital Assistants (RDAs), smart phones, desktop computers, laptop computers, tablet computers, netbooks, and/or mobile communication terminals.

In accordance with another aspect of the present invention, there is provided an apparatus for remotely deleting critical information, including a PUF unit configured to receive an input value of input and output values of a PUF transmitted from a server, and to generate an output value independent of the former output value; and a deletion unit configured to determine whether to delete critical information based on the latter output value independent of the former output value and the former output value, and to delete the critical information based on results of the determination.

The deletion unit may measure the hamming distance between the latter output value independent of the former output value and the latter output value, and may delete the critical information if the measured hamming distance is shorter than a predetermined value.

The apparatus may further include message generation means for generating a message indicative of results of the deletion of the critical information of the deletion unit and transmitting the message to the server.

In accordance with still another aspect of the present invention, there is provided a method of deleting critical information, including storing, by a server, an input value and a first output value for the input value with respect to a PUF of each of a plurality of mobile terminals in a storage unit; determining, by the server, an identity of a corresponding mobile terminal based on received information about loss of the mobile terminal; extracting, by the server, input and first output values of a PUF of the corresponding mobile terminal from the storage unit based on information obtained through the determining of the identity, and broadcasting, by the server, the input and first output values to all the mobile terminals; receiving, by each of all the mobile terminals, an input value of input and first output values of a PUF from a server, and calculating, by each of all the mobile terminals, a second output value via its own PUF unit; and determining, by each of all the mobile terminals, whether to delete critical information based on the first and second output values, and deleting, by each of all the mobile terminals, the critical information based on results of the determination.

The method may further include, before the storing, measuring the first output value for the input value determined with respect to the PUF of each of the mobile terminals.

The storing may include storing the input and first output values for the PUF of each of the mobile terminals as an input value-output value pair.

The deleting may include measuring a hamming distance between the first and second output values, and deleting the critical information if the measured hamming distance is shorter than a predetermined value.

The apparatus may further include, after the deleting, generating a message indicative of the results of the deletion of the critical information of the deletion unit, and transmitting the message to the server.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
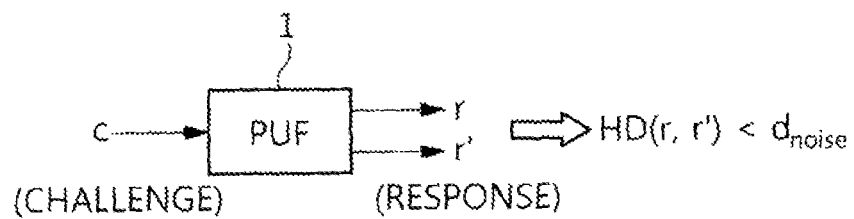
FIG. 1 is a diagram illustrating the characteristics of a PIT.

In order to remotely delete critical information, both the transmitter authentication of a server that issues a deletion command and the recipient authentication of a target mobile terminal that receives the deletion command are required. In general, for this purpose, a separate encryption algorithm, such as a digital signature, and authentication keys are required.

The present invention is directed to a method that remotely deletes critical information securely using only a PUF based on physical characteristics intrinsic to a device, such as a chip, instead of using an encryption algorithm and keys. Accordingly, the present invention does not require a PKI that is required by a conventional method of remotely deleting information.

An apparatus and method for remotely deleting critical information according to embodiments of the present invention will be described below with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples, and do not exhaustively present the technical spirit of the present invention. Accordingly, it should be appreciated that there may be various equivalents and modifications that can replace the examples at the time at which the present application is filed.

First, a PUF that is employed in the present invention will be described.

A PUF is an unclonable one-way function using a physical characteristic unique to the inside of a device, such as a chip. A PUF is configured to output a response through evaluation with respect to a challenge that is given as an input. Generally, a PUF is not a mathematical function. That is, a PUF may generate a different response value when the same challenge is repeatedly measured.

Accordingly, since a parameter $d_{noise}$ is used, as illustrated in FIG. 1, a PUF 1 is characterized in that the hamming distance (HD) between response values r and r' that are obtained by performing measurement with respect to the same challenge c twice is shorter than $d_{noise}$. Here, the challenge c may be an input value, the response value r may be a first output value, the response value r' may be a second output value, and $d_{noise}$ may be a value preset based on the characteristics of the PUF 1. That is, $d_{noise}$ is a parameter having a unique value for each PUF 1. It will be apparent that $d_{noise}$ may be set to a predetermined value as described above, but may be set such that it can be adjusted if necessary.

Figure 2:
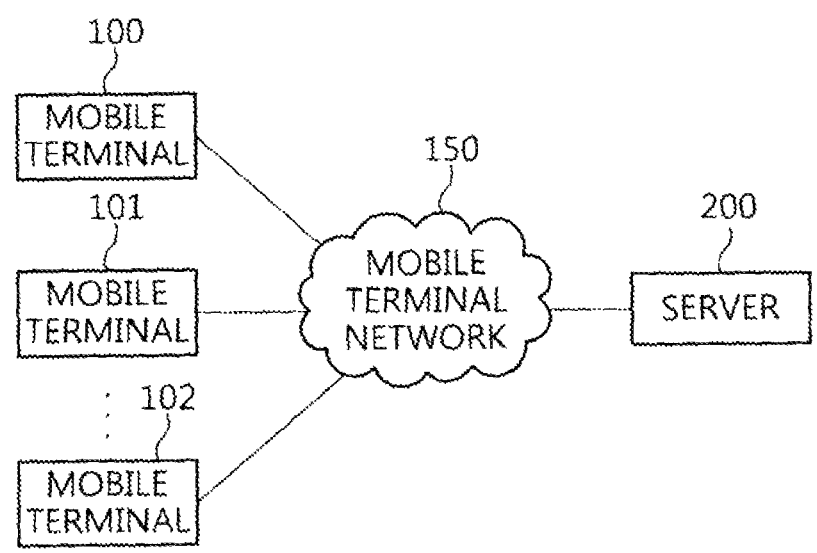
FIG. 2 is a diagram schematically illustrating the configuration of a network in which an apparatus for remotely deleting critical information according to an embodiment of the present invention has been employed.

FIG. 2 is a diagram schematically illustrating the configuration of a network in which an apparatus for remotely deleting critical information according to an embodiment of the present invention has been employed.

Referring to FIG. 2, mobile terminals 100, 101 and 102 and a server 200 communicate with each other over a mobile terminal network 150.

The mobile terminals 100, 101 and 102 may be any type of devices that are configured to perform electronic communication. For example, the mobile terminals 100, 101 and 102 may be mobile phones, satellite phones, Personal Digital Assistants (PDAs), smart phones, desktop computers, laptop computers, tablet computers, netbooks, mobile communication terminals, and/or the like.

Each of the mobile terminals 100, 101 and 102 receives a challenge-response pair from the server 200, calculates a response value for the received challenge using its own PUF, and deletes its own critical information, for example, a master key, a wrap key, a session key, and an operation key, if the transmitted response value is identical to the calculated response value. Each of the mobile terminals 100, 101 and 102 is equipped with a PUF, and the PUF has a unique output (a response r) even to an identical input (a challenge c). The internal configuration of the mobile terminals 100, 101 and 102 will be described later.

The mobile terminal network 150 is a network that enables information communication between the mobile terminals 100, 101 and 102 and the server 200. For example, the mobile terminal network 150 may be a cellular network, a satellite network, a WiFi network, a WiMAX network or the like. It will be apparent that the mobile terminal network 150 may be any type of network mobile that enables information communication between the terminals 100, 101 and 102 and the server 200, other than the above enumerated networks. If necessary, the mobile terminal network 150 may be connected to one or more additional mobile terminal networks or one or more other networks via an appropriate method, for example, via the Internet, or a public switched telephone network (PSTN).

The server 200 measures and stores a response value for a challenge determined with respect to the PUF of each of the mobile terminals 100, 101 and 102. Thereafter, the server 200 determines the identity of a lost terminal of the mobile terminals 100, 101 and 102, and broadcasts a corresponding challenge-response pair to all the mobile terminals 100, 101 and 102. The reason to broadcast the corresponding challenge-response pair to all the mobile terminals 100, 101 and 102 is to enable each of the mobile terminals 100, 101 and 102 to calculates a response value using the received challenge as an input and allow only a mobile terminal in which the calculated response value is identical to the received response value to delete its own critical information. The internal configuration of the server 200 will be described below.

Figure 3:
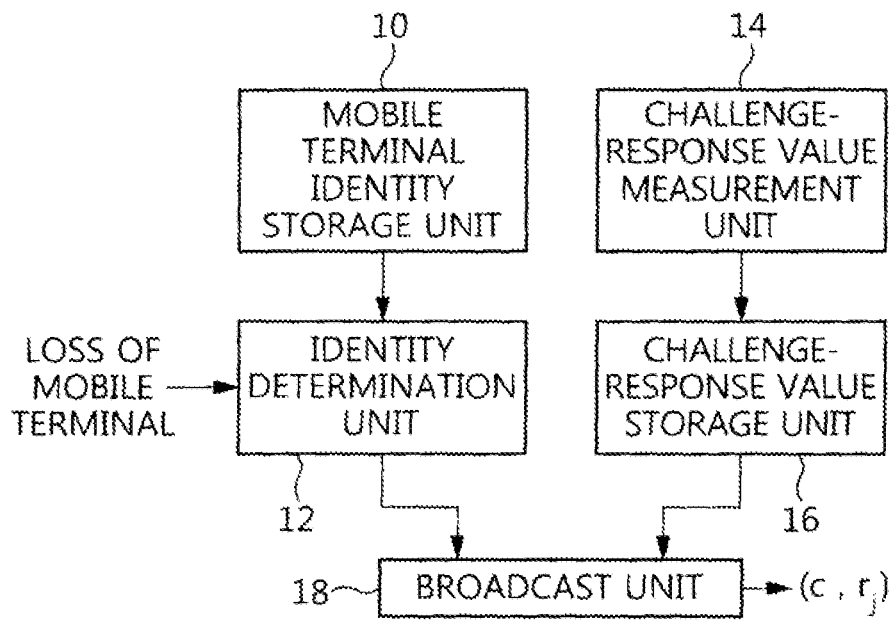
FIG. 3 is a diagram illustrating the internal configuration of the server illustrated in FIG. 2.

FIG. 3 is a diagram illustrating the internal configuration of the server 200 illustrated in FIG. 2. The server 200 may be an example of the apparatus for remotely deleting critical information according to the present invention. It will be apparent that each of the mobile terminals 100, 101 and 102 that will be described in detail later may be an example of the apparatus for remotely deleting critical information according to the present invention.

The server 200 includes a mobile terminal identity storage unit 10, an identity determination unit 12, a challenge-response value measurement unit 14, a challenge-response value storage unit 16, and a broadcast unit 18.

The mobile terminal identity storage unit 10 stores the identity of each of the mobile terminals 100, 101 and 102 (for example, the ID of a USIM embedded in the mobile terminal). The mobile terminal identity storage unit 10 is an example of the storage unit that is described in claim 3 of the claims of this application.

The identity determination unit 12 determines the identity of the corresponding mobile terminal (for example, the ID of a USIM embedded in the mobile terminal) in the mobile terminal identity storage unit 10 based on mobile terminal loss information transferred from the outside. While the mobile terminal identity storage unit 10 and the identity determination unit 12 are configured to be separate from each other in FIG. 3, the mobile terminal identity storage unit 10 may be included in the identity determination unit 12. While the identity determination unit 12 determines the identity using the ID of a USIM embedded in the mobile terminal by way of example in the foregoing description, the ID of the PUF of the mobile terminal may be used if necessary.

The challenge-response value measurement unit 14 measures an output value for an input value (challenge c) determined for the PUF of each of the mobile terminals 100, 101 and 102 (that is, an initial output value (a first output value)), and transmits the measured output value to the challenge-response value storage unit 16.

The challenge-response value storage unit 16 stores the input value and the output value for the input value (that is, the initial output value), which are transmitted from the challenge-response value measurement unit 14, for the PUF of each of the mobile terminals 100, 101 and 102. In other words, the challenge-response value storage unit 16 stores the input value and the output value for the PUF of each of the mobile terminals 100, 101 and 102 as an input value-output value pair. The challenge-response value storage unit 16 is an example of the storage unit that is described in claim 1 of the claims of this application.

Once the broadcast unit 18 has received the identity of the lost mobile terminal from the identity determination unit 12, the broadcast unit 18 extracts the input value c and output value $r_j$ of the PUF of the mobile terminal corresponding to the identity from the challenge-response value storage unit 16, and then broadcasts them to all the mobile terminals 100, 101 and 102.

Figure 4:
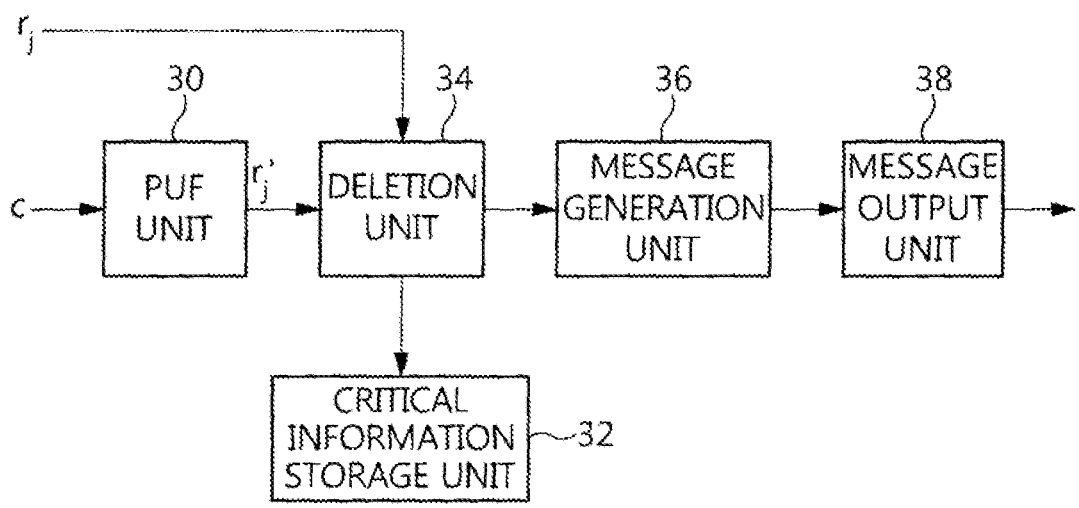
FIG. 4 is a diagram illustrating the internal configuration of the mobile terminal illustrated in FIG. 2.

FIG. 4 is a diagram illustrating the internal configuration of any one of the mobile terminals 100, 101 and 102 illustrated in FIG. 2. Since the internal configurations of the mobile terminals 100, 101 and 102 are the same, it is sufficient if only the internal configuration of the mobile terminal 100 will be described below.

The mobile terminal 100 includes a PUF unit 30, a critical information storage unit 32, a deletion unit 34, a message generation unit 36, and a message output unit 38.

The PUF unit 30 generates and outputs a predetermined response value $r_j'$ for the received input value (challenge c) through evaluation. In other words, the PUF unit 30 receives the input value c of the input value c and output value $r_j$ of the PUF transmitted from the server 200, and generates an output value $r_j'$ independent of the output value $r_j$ corresponding to the input value c.

The critical information storage unit 32 stores critical information, such as a master key, a wrap key, a session key, and an operation key, that is importantly used in the cryptosystem of the corresponding mobile terminal 100.

The deletion unit 34 determines whether to delete the critical information based on the output value $r_j$ of the input value c and output value $r_j$ of the PUF transmitted from the server 200 and the output value $r_j'$ transferred from the PUF unit 30. The deletion unit 34 deletes the critical information based on the results of the determination. In greater detail, the deletion unit 34 measures the hamming distance between the output value $r_j$ and the output value $r_j'$, and deletes the critical information if the measured hamming distance is shorter than a set value $d_{nose}$.

The message generation unit 36 generates an ack message indicative of the results of the deletion of the critical information of the deletion unit 34.

The message output unit 38 transmits the ack message generated by the message generation unit 36 to the server 200.

In FIG. 4, the message generation unit 36 and the message output unit 38 may be collectively referred to as "message generation means."

In a method of deleting critical information according to an embodiment of the present invention, processing is first performed on the server 200, and then processing is performed on each of the mobile terminals 100, 101 and 102. Although the processing at the server and the processing at the mobile terminal may be illustrated in a single drawing, the drawing becomes excessively complicated in this case. Accordingly, in the following description, the processing at the server will be described first, and the processing at the mobile terminal will be described subsequently.

Figure 5:
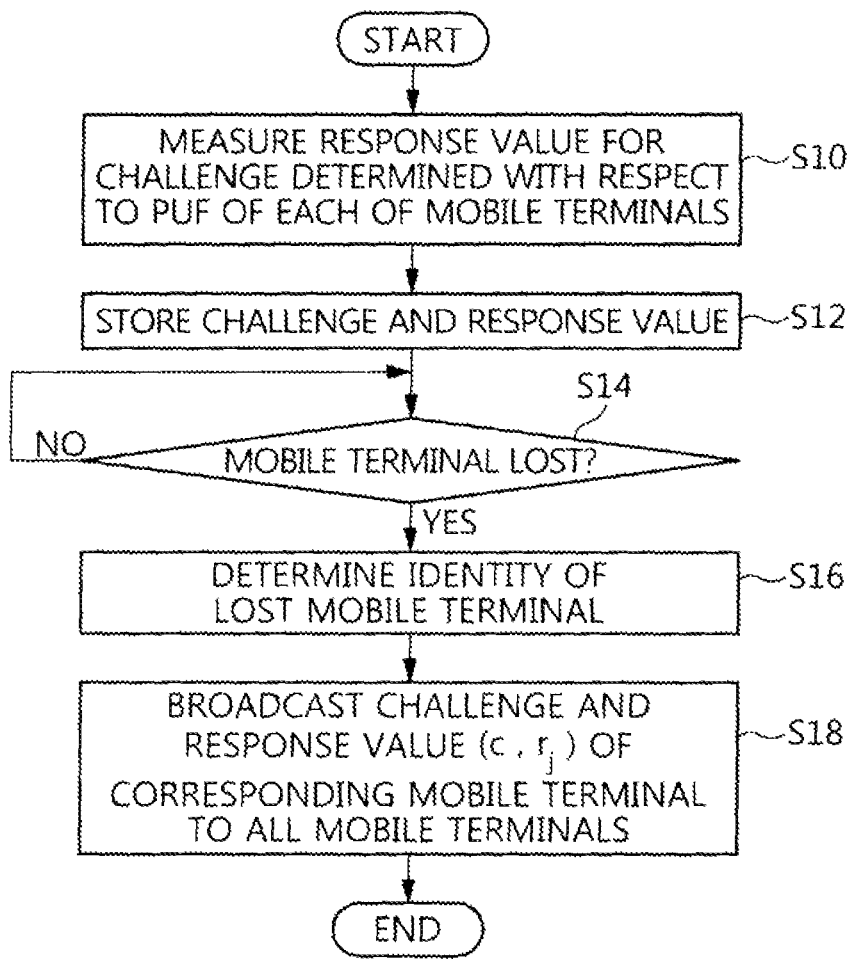
FIG. 5 is a flowchart illustrating processing at the server in a method of deleting critical information according to an embodiment of the present invention.

FIG. 5 is a flowchart illustrating the processing at the server 200 in the method of deleting critical information according to the embodiment of the present invention.

First, the server 200 measures a response value $r_i$ for a challenge c (that is, an input value) determined for $PUF_i$ of each of the mobile terminals 100, 101 and 102 at step S10.

Thereafter, the server 200 stores the challenge c and the response value $r_i$ for each of the mobile terminals 100, 101 and 102 as a challenge c-response value $r_i$ pair at step S12.

Thereafter, the server 200 waits for the input of information indicative of the loss of a mobile terminal. Here, the information indicative of the loss of the mobile terminal is directly input by a user who lost the corresponding mobile terminal.

If the server 200 receives the information indicative of the loss of the mobile terminal ("Yes" at step S14), the server 200 determines the identity j of the lost mobile terminal at step S16.

Thereafter, the server 200 broadcasts a challenge c-response $r_j$ pair that matches $PUF_j$ corresponding to the determined identity j to all the mobile terminals 100, 101 and 102 at step S18.

Figure 6:
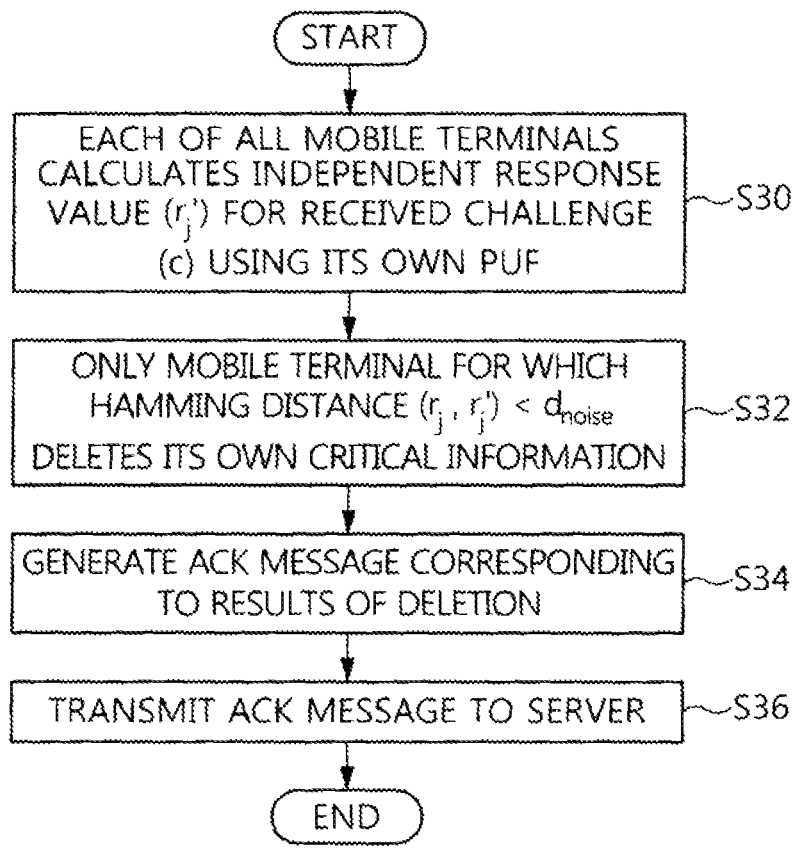
FIG. 6 is a flowchart illustrating the processing at each of the mobile terminals in the method of deleting critical information according to an embodiment of the present invention.

FIG. 6 is a flowchart illustrating the processing at each of the mobile terminals 100, 101 and 102 in the method of deleting critical information according to an embodiment of the present invention.

Each of all the mobile terminals 100, 101 and 102 that have received the challenge c-response $r_j$ pair from the server 200 calculates a response value $r_j'$ for the input value (challenge c) via its own PUF unit 30 at step S30. Here, the response value $r_j$ becomes a first output value, and the response value $r_j'$ becomes a second output value.

Thereafter, each of all the mobile terminals 100, 101 and 102 determines whether to delete the critical information based on the response value $r_j$ and the response value and deletes the critical information based on the results of the determination. Here, only one of the mobile terminals 100, 101 and 102 for which the hamming distance between the response value $r_j$ and the response value $r_j'$ is shorter than the set value deletes its own critical information at step S32. Here, the case in which the hamming distance between the response value $r_j$ and the response value is shorter than the set value $d_{noise}$ corresponds to the case in which the transmitted response value is identical to the calculated response value, which is described in conjunction with the mobile terminals 100, 101 and 102 and FIG. 2.

Thereafter, the mobile terminal that has deleted its own critical information generates an ack message indicative of the results of the deletion at step S34.

Thereafter, the mobile terminal that has deleted its own critical information transmits the ack message to the server 200 at step S36.

In the above-described FIGS. 5 and 6, steps S14 to S18 and steps S30 to S36 are repeated until the server 200 receives the ack message indicative of the results of the deletion.

As described above, according to the present invention, only the server and the PUF of the lost mobile terminal can generate an appropriate response in connection with which the hamming distance to the challenge c is shorter than $d_{noise}$, and thus it is possible to reliably authenticate the server, that is, a transmitter, and the mobile terminal (a target device for the deletion of critical information) equipped with a corresponding PUF, that is, a recipient. Accordingly, it is impossible for an attacker to remotely delete the critical information of a specific mobile terminal freely.

Furthermore, according to the above-described present invention, it is possible, to remotely and safely delete critical information even in an environment in which an infrastructure, such as a PKI, has not been established because a separate encryption algorithm and separate keys are not used.

In particular, according to the present invention, after the operation key of a chip has been remotely eliminated, the chip cannot return to an active state until an illegitimate key is applied thereto. Accordingly, according to the present invention, it is completely impossible to operate the chip after the chip has been deactivated.

Furthermore, according to the present invention, the apparatus and method of the present invention can be operated without requiring additional data, such as helper data, and an error correction code because the apparatus and method of the present invention use only a PUF without requiring a fuzzy extractor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for remotely deleting critical information using a physically unclonable function (PUF), the apparatus communicating with a plurality of mobile terminals over a mobile terminal network and comprising:
    a storage unit configured to store an input value and an output value for the input value with respect to a physically unclonable function (PUF) of each of the plurality of mobile terminals;
    an identity determination unit configured to determine an identity of a lost one of the plurality of mobile terminals based on information about loss of the mobile terminal which is received from a user of the lost mobile terminal; and
    a broadcast unit configured to extract input and output values of a PUF of the lost mobile terminal from the storage unit based on information on the identity transferred from the identity determination unit, and to broadcast the extracted input and output values to each of the plurality of mobile terminals over the mobile terminal network so that each of the plurality of mobile terminals can delete the critical information using the extracted input and output values.

2. The apparatus of claim 1, further comprising a measurement unit configured to measure the output value for the input value determined with respect to the PUF of each of the mobile terminals, and to transmit the measured output value to the storage unit.

3. The apparatus of claim 1, further comprising a storage unit configured to store an identity of each of the mobile terminals.

4. The apparatus of claim 1, wherein the storage unit stores the input and output values for the PUF of each of the mobile terminals as an input value-output value pair.

5. The apparatus of claim 1, wherein the mobile terminals are mobile phones, satellite phones, Personal Digital Assistants (PDAs), smart phones, desktop computers, laptop computers, tablet computers, netbooks, and/or mobile communication terminals.

6. An apparatus for remotely deleting critical information using a physically unclonable function (PUF), the apparatus communicating with a server over a mobile terminal network and comprising:
    a PUF unit configured to, when input and output values of a PUF are transmitted from the server to the apparatus, receive the input value of the PUF transmitted from the server, and to generate an output value other than the output value of the PUF transmitted from the server; and
    a deletion unit configured to determine whether to delete critical information based on the generated output value and the output value transmitted from the server, wherein the deletion unit measures a hamming distance between the generated output value and the transmitted output value, and deletes the critical information if the measured hamming distance is shorter than a predetermined value.

7. The apparatus of claim 6, further comprising message generation means for generating a message indicative of results of the deletion of the critical information of the deletion unit and transmitting the message to the server.

8. A method of deleting critical information using a physically unclonable function (PUF) where a server communicates with a plurality of mobile terminals over a mobile terminal network, comprising:
   storing, by the server, an input value and a first output value for the input value with respect to a PUF of each of the plurality of mobile terminals in a storage unit;
   determining, by the server, an identity of a lost one of the plurality of mobile terminals based on information about loss of the mobile terminal which is received from a user of the lost mobile terminal;
   extracting, by the server, input and first output values of a PUF of the lost mobile terminal from the storage unit based on information obtained through the determining of the identity, and broadcasting, by the server, the input and first output values to each of the plurality of mobile terminals over the mobile terminal network;
   receiving, by each of the plurality of mobile terminals, the input value of the input and first output values of the PUF from the server, and calculating, by each of the plurality of mobile terminals, a second output value using a PUF unit of each of the plurality of mobile terminals; and
   determining, by each of the plurality of mobile terminals, whether to delete critical information based on the first and second output values, and deleting, by each of all the plurality of mobile terminals, the critical information based on results of the determination.

9. The method of claim 8, further comprising, before the storing, measuring the first output value for the input value determined with respect to the PUF of each of the mobile terminals.

10. The method of claim 8, wherein the storing includes storing the input and first output values for the PUF of each of the mobile terminals as an input value-output value pair.

11. The method of claim 8, wherein the deleting includes measuring a hamming distance between the first and second output values, and deleting the critical information if the measured hamming distance is shorter than a predetermined value.

12. The method of claim 8, further comprising, after the deleting, generating a message indicative of results of the deletion of the critical information of the deletion unit, and transmitting the message to the server.

* * * * *